United States Patent

[11] 3,550,879

| [72] | Inventors | John J. Bundschuh;<br>Robert J. Roman; Kenneth W. Thomson,<br>Rochester, N.Y. |
|---|---|---|
| [21] | Appl. No. | 643,502 |
| [22] | Filed | June 5, 1967 |
| [45] | Patented | Dec. 29, 1970 |
| [73] | Assignee | Eastman Kodak Company<br>Rochester, N.Y.<br>a corporation of New Jersey<br>Continuation of application Ser. No.<br>470,499, July 8, 1965, now abandoned. |

[54] CINEMATOGRAPHIC CARTRIDGE PROJECTOR APPARATUS
6 Claims, 17 Drawing Figs.

[52] U.S. Cl................................................ 242/192,
242/195, 242/197, 242/201; 352/25, 352/72,
352/123
[51] Int. Cl...................................................... G11b 15/30,
G11b 15/66, G11b 23/10

[50] Field of Search.... ......... ......... ......... 242/55.12,
55.13, 55.11, 55.14, 67.4, 67.5; 352/158, 157, 72,
73, 78; 274/4, 11; 242/54.1

[56] References Cited
UNITED STATES PATENTS
| 2,891,736 | 6/1959 | Blaes............................ | 242/55.12 |
| 3,429,518 | 2/1969 | McKee......................... | 242/55.11 |

*Primary Examiner*—George F. Mautz
*Attorneys*—Robert W. Hampton and James A. Smith ABSTRACT: An apparatus, such as a cinematographic projector, for use with cartridges containing rolls of strip material and in which the cartridges may be selectively and/or automatically moved in sequence into operation position, the projector also being capable of use with individual cartridges containing rolls of strip material. In operating position the strip material is initially wound on the roll to tighten loose convolutions thereon, automatically moved out of the cartridge by means of a stripper mechanism and directed to an automatic threading mechanism of the apparatus, and then rewound into the cartridge after the strip material has been displayed.

PATENTED DEC 29 1970  3,550,879

JOHN J. BUNDSCHUH
ROBERT J. ROMAN
KENNETH W. THOMSON
INVENTORS

BY *James A...*
*Robert W Hampton*

ATTORNEYS

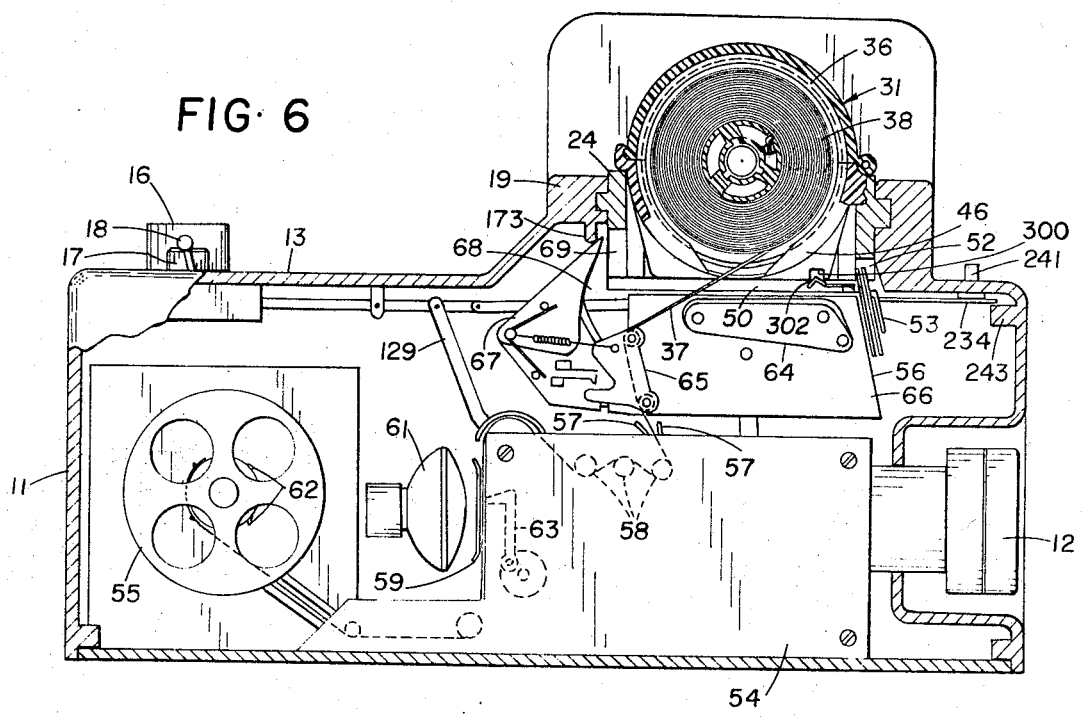
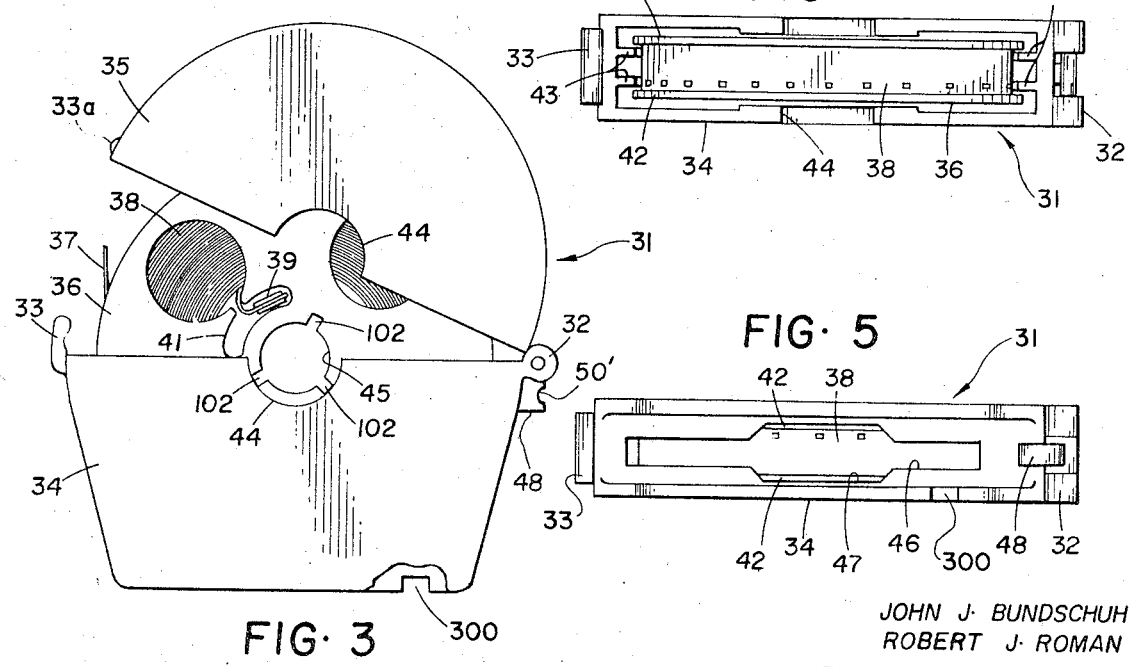

JOHN J. BUNDSCHUH
ROBERT J. ROMAN
KENNETH W. THOMSON
INVENTORS

BY
ATTORNEYS

JOHN J. BUNDSCHUH
ROBERT J. ROMAN
KENNETH W. THOMSON
INVENTORS

BY James A. ...
Robert W. Hampton
ATTORNEYS

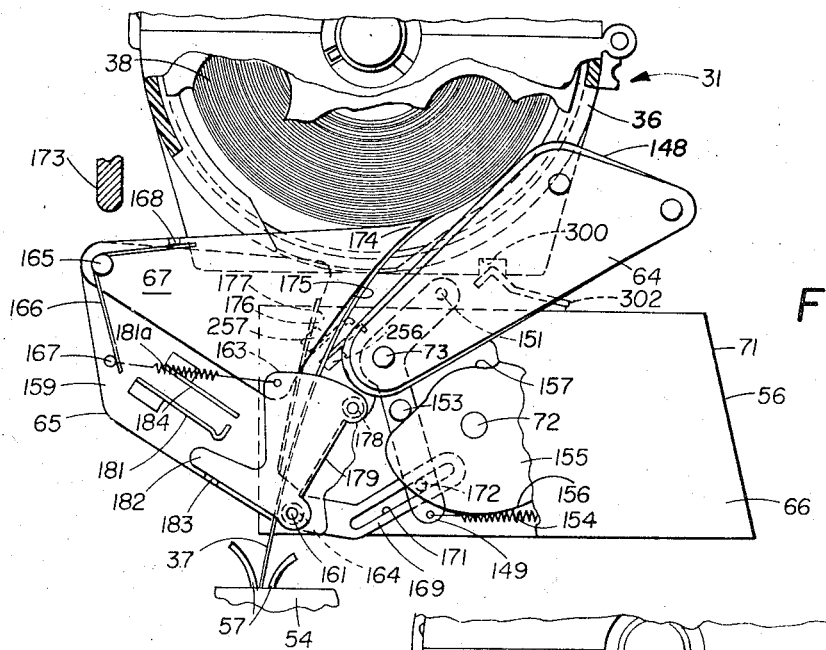
FIG·11
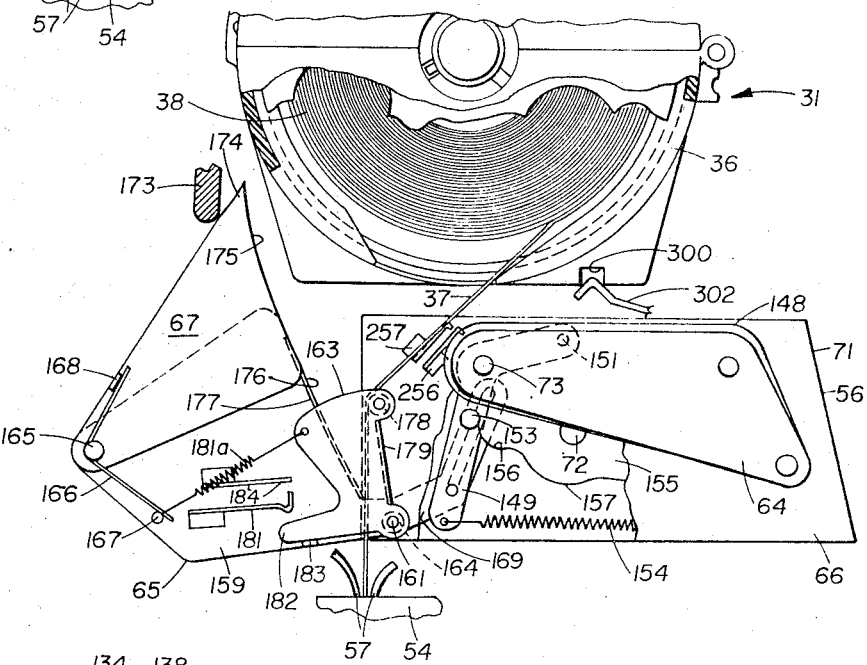
FIG·12
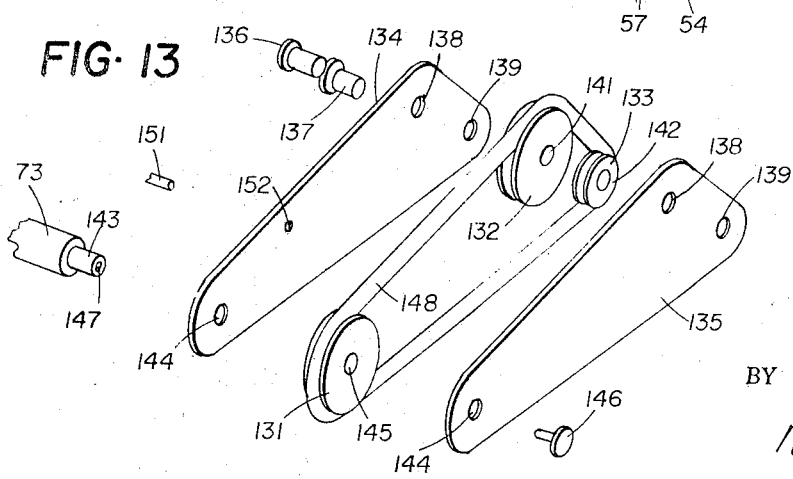
FIG·13
JOHN J. BUNDSCHUH
ROBERT J. ROMAN
KENNETH W. THOMSON
INVENTORS
BY James A. Smith
Robert W. Hampton
ATTORNEYS

JOHN J. BUNDSCHUH
ROBERT J. ROMAN
KENNETH W. THOMSON
INVENTORS

BY James A. Smith
Robert W. Hampton
ATTORNEYS

CINEMATOGRAPHIC CARTRIDGE PROJECTOR APPARATUS

Reference is made to the copending and commonly assigned U. S. Pat. Application Ser. No. 706,703, entitled "-Device for Stripping and Feeding Strip Material from a Roll," filed Feb. 19, 1968, in the name of Edward S. McKee, now U.S. Pat. No. 3,429,518 such application being a continuation of U.S. Pat. Ser. No. 470,499, "Automatic Film Stripper", filed Jul. 8, 1965, now abandoned.

The present invention relates to an apparatus, such as a cinematographic projector, which may accommodate an individual cartridge containing a roll of strip material, or may accommodate a plurality of such cartridges by automatically moving them selectively and/or sequentially into operating position.

In known apparatus of this type, a plurality of strip material units are provided, each of which comprises a supply reel and a takeup reel, with the strip material, such as film, in each unit being permanently attached at its opposite ends to the respective reels. As a strip material unit is moved into projecting position, a length of film extending between the two reels is fed into the projector gate and is engaged by an appropriate film advancing mechanism adapted to feed it through the projector apparatus from the supply reel to the takeup reel. After the film has been displayed, it is then rewound onto the supply reel, either before or after the film unit has been moved to allow a subsequent unit to assume the projection position. In some projectors of this type, the film unit may comprise individually removable double-reel film magazines, which facilitate exchanging individual films or changing the sequence in which the films are displayed.

To reduce the bulkiness and the inherent relatively high cost associated with such double-reel magazines and to eliminate the necessity for attaching the leading end of the film manually to the takeup reel when the magazines are loaded with film, the present invention eliminates the takeup reels from the individual film units by providing means, such as an automatic film stripper for withdrawing the leading end of the film from a film supply reel in a magazine or cartridge located at operating position, threading it through the projector gate, and attaching it to a single takeup reel that will individually serve all of the supply reels in sequence. Analogous single-reel film magazines have been devised previously to facilitate the loading of single film projectors by eliminating entirely the manual film threading operation normally required. In such constructions, the single-reel magazines have embodied special film reels and/or other means for retaining the free end of the film in position for engagement by the threading system of the projector, including in most cases a special leader element permanently attached to the film itself. For maximum economy and simplicity of operation, however, the present invention embodies a further improvement of such single-reel magazine systems, whereby each magazine or cartridge is loaded simply by inserting in the cartridge the standard film reel on which the film is received after being processed, for example, a 50-foot reel of 8mm. film, without any need for rewinding the film or attaching any sort of auxiliary device thereto.

When the loaded magazine or cartridge is moved into the projection position, a film stripping mechanism automatically engages the leading end of the film, separates it from the roll of film in the cartridge and feeds it into the threading mechanism of the projector. In other types of apparatus, such as tape recorders and paper winding equipment, it is known to perform a similar operation by rotating the supply reel in an unwinding direction as a stripper finger is engaged with the roll of strip material to encounter and direct the leading end of the rotating strip material along a predetermined path, such as is shown in the Ellmore U.S. Pat. No. 3,006,650, which issued Oct. 31, 1961. If the supply roll is wound very tightly and is rotated relatively slowly, such an arrangement is capable of reliable performance, but, if not, the unwinding rotation of the reel may tend to expand the outer convolutions of the strip material roll rather than to rotate the entire roll. This possibility is particularly likely to occur in cinematographic film winding devices due to the inherent resiliency and slipperiness of the film, which often results in spontaneous unwinding of a film roll, commonly referred to as "clockspringing." Accordingly, rather than driving the reel itself to rotate the film roll in an unwinding direction in engagement with the stripper finger, the present invention produces such rotation by engaging the outer film convolution with a moving driving belt engaging the film roll ahead of the stripper finger location. Additionally, to further insure against buckling or jamming of the film if the roll is already expanded within the magazine or cartridge, the reel itself is driven rapidly in a rewinding direction during the first portion of the stripping operation, to wind the roll tightly before it is rotated in the opposite direction by the driving wheel or belt.

As the film is being threaded through the projector unit and engaged with the takeup reel, and during the subsequent projection operation, the reel is allowed to rotate freely. When the entire length of film has been displayed, the film advancing means are disengaged from the film and the reel is rotated in a rewinding direction to withdraw the film back into the magazine. Upon completion of the rewinding operation, with the film again located entirely within the magazine, the magazine is moved automatically out of the projection position and the next magazine is moved into the projection position, whereupon the above-described operations are repeated until all of the films in the available magazines have been displayed.

Due to complications involved in coordinating the performance of such various functions, previously conceived multiple film projectors generally have been only partially automatic in operation and/or have failed to provide means for selectively bypassing a particular magazine, allowing the films to be displayed other than in a predetermined sequence, or incorporating in the machine a projector device capable of displaying the films at various speeds in either a forward or reverse direction. All of these objectives are realized in accordance with the present invention, which additionally incorporates an automatic interlock system to insure against possible damage to the film or machine components in the event of a mechanical malfunction or the occurrence of an improper operating procedure. Still another important feature of the invention resides in the provision of novel means whereby the various magazines or cartridges containing film supply reels are carried by a removable rack structure, which allows the individual films to be rearranged or exchanged easily and quickly, and the entire film sequence to be removed from the machine for storage.

These and other important features of the invention will be apparent from the following detailed description of a preferred embodiment thereof, with reference being made to the accompanying drawings. Throughout the drawings, like reference numerals refer to like elements, and it should be understood that the various depicted structures have been simplified for purposes of clarity by omitting details and structure not essential to an understanding of the basic construction and mode of operation of the subject machine. Likewise, to further simplify the description of the invention, a figure illustrating a mechanism for performing a particular function may omit elements related to the performance of a different function, as in the case of those features showing the operation of various different mechanisms actuated by means of corresponding cams located along the common camshaft member.

In the drawings:

FIG. 3 is a side elevational view of one of the strip material or film cartridges with its upper casting member partially open to show the film reel housed therein;

FIG. 4 is a top plan view of the film cartridge shown in FIG. 3 with the upper casing member removed;

FIG. 5 is a bottom plan view of the film cartridge shown in FIGS. 3 and 4;

FIG. 6 is a longitudinal cross section view of the apparatus taken along the line 6–6 of FIG. 1;

FIG. 11 is a partial side elevational view corresponding to a portion of FIG. 6, showing the operation of the film stripping and guiding mechanism during the stripping operation, with sections of the assembly shown broken away to illustrate internal elements of the mechanism;

Figure 1:
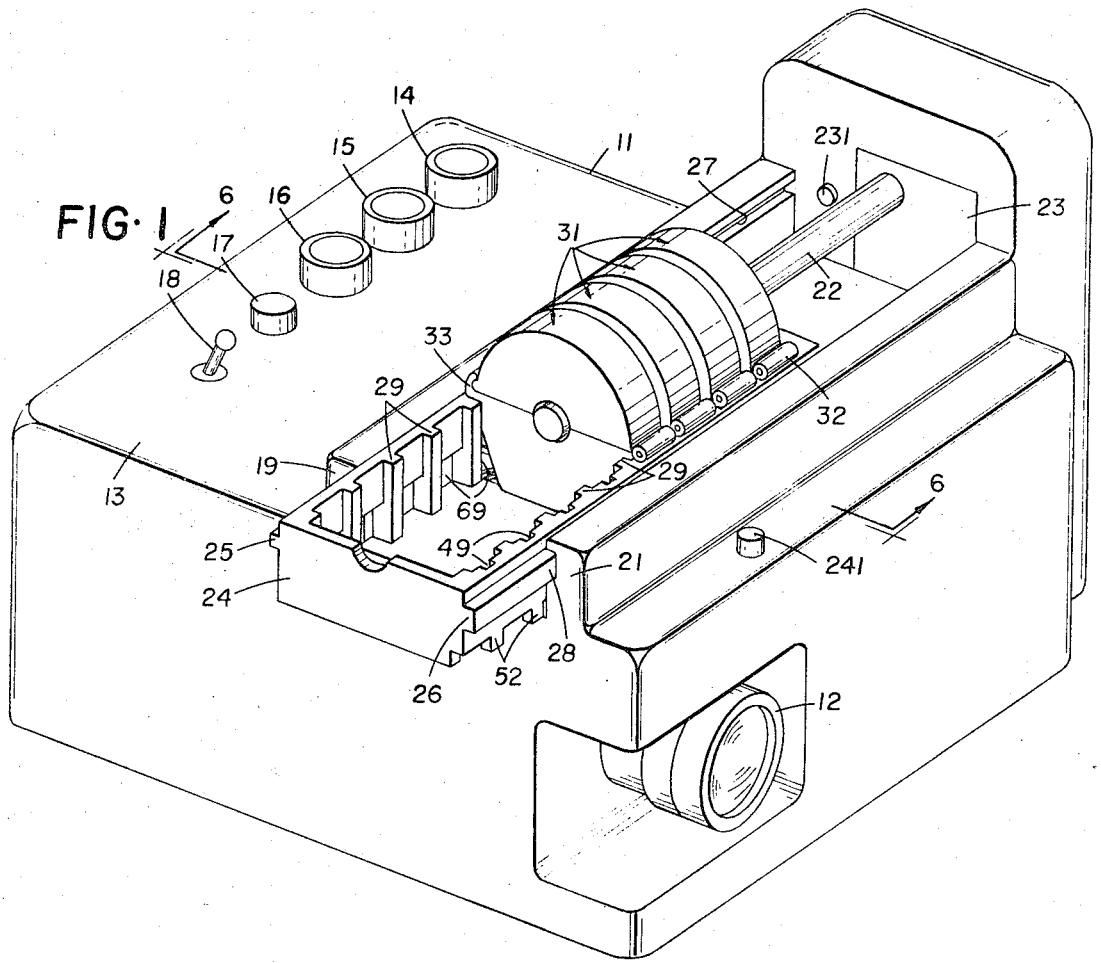
FIG. 1 is a perspective view of the complete projector apparatus, taken from the right front corner thereof, with a partially filled magazine or cartridge rack in operating position.
Figure 14:
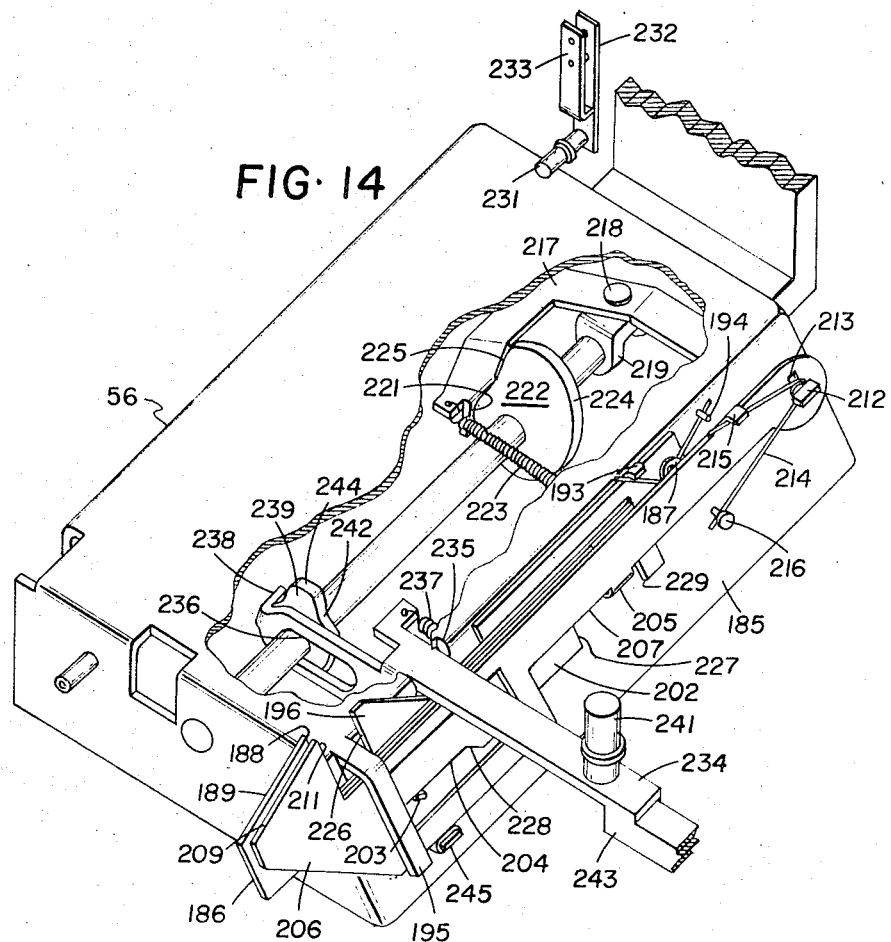
Figure 15:
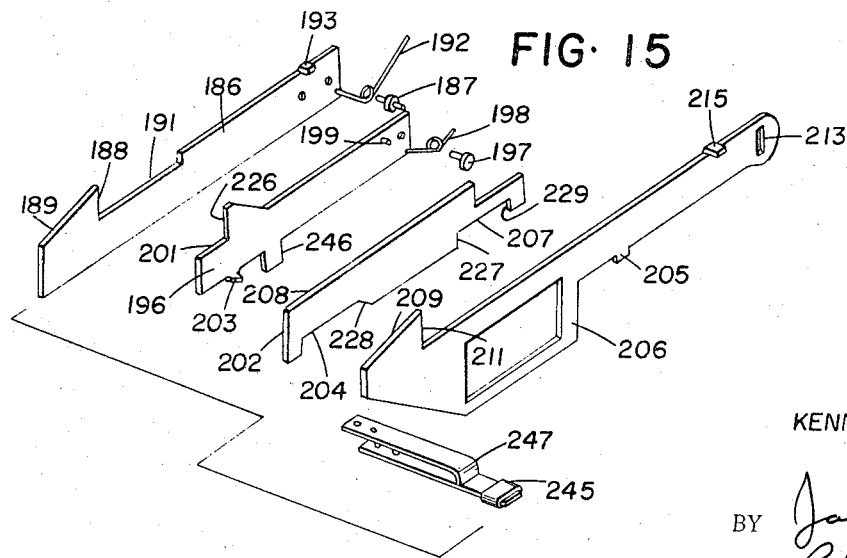
Figure 16:
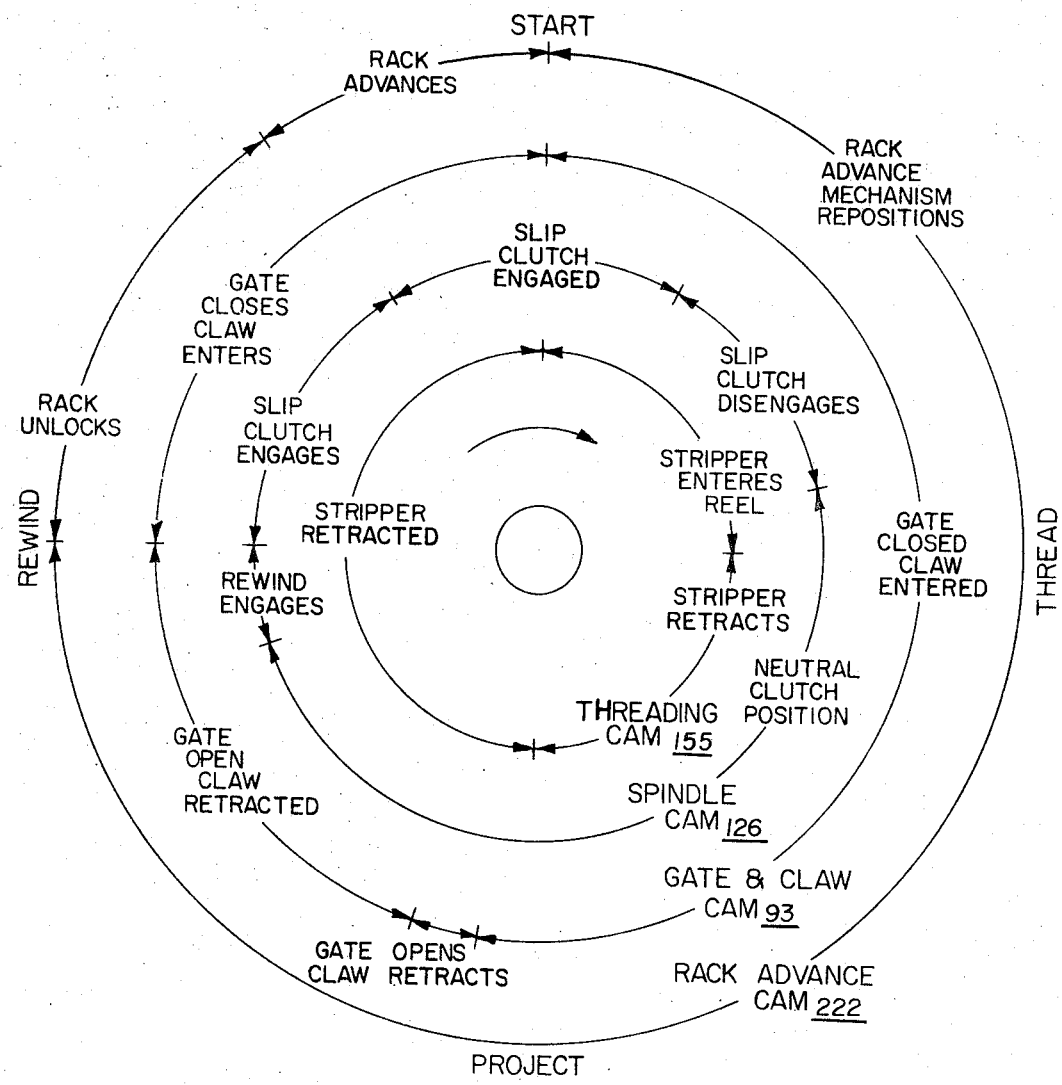
Figure 17:
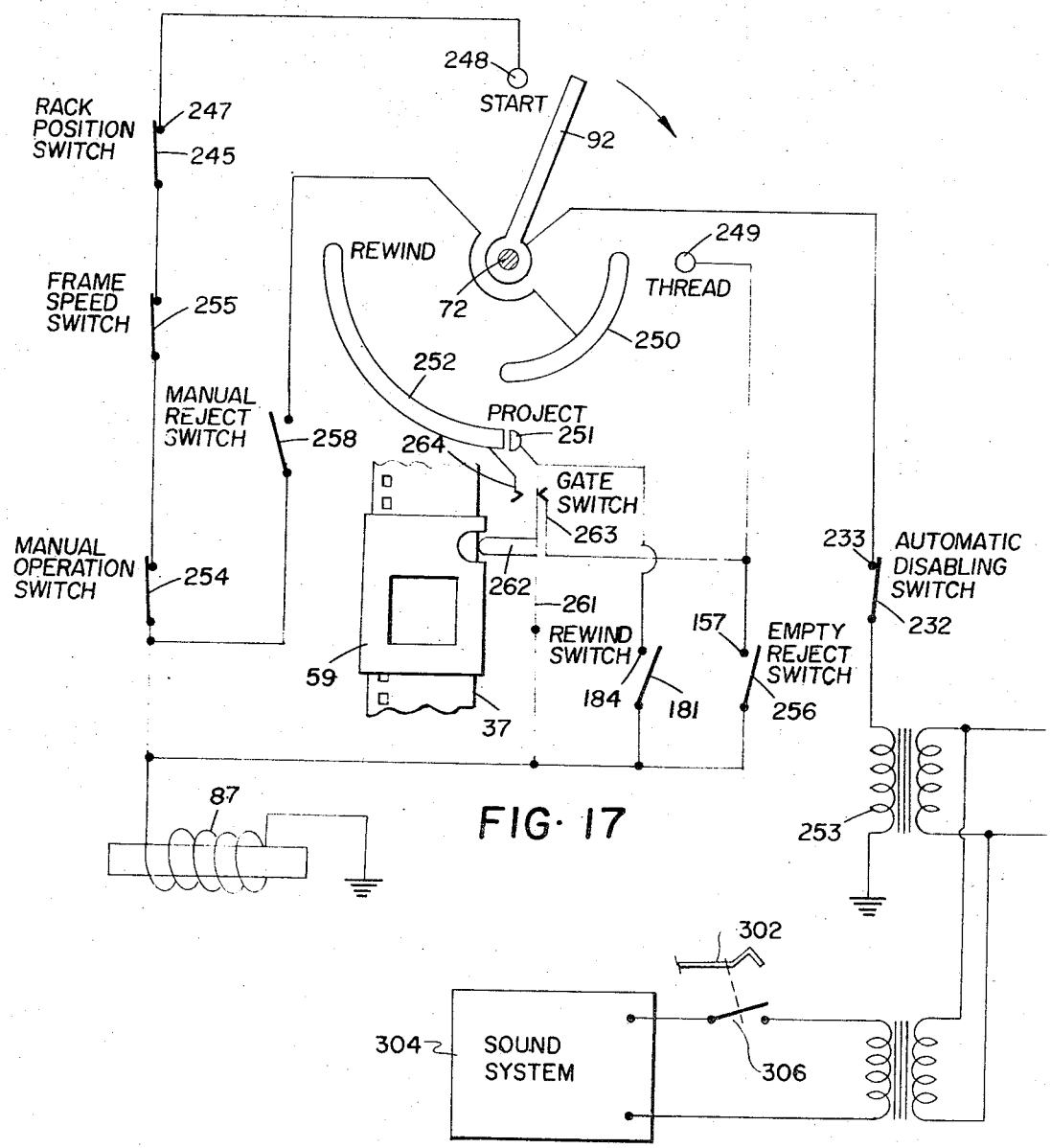

FIG. 12 corresponds to FIG. 11 and shows the location of the various illustrated components in their respective retracted positions;

FIG. 13 is an exploded perspective view showing the construction of the film roll driving belt device incorporated in the film stripping mechanism illustrated in FIGS. 11 and 12;

FIG. 14 is a perspective view of the control assembly; partially broken away, taken from the same general viewpoint as FIG. 1 and illustrating the components comprising the rack advancing mechanism;

FIG. 15 is an exploded perspective view of the rack advancing lever arrangement shown in FIG. 14;

FIG. 16 is a schematic diagram showing the sequence and duration of the various machine functions controlled by the cam mechanism of the control assembly during one complete operating cycle; and FIG. 17 is a schematic diagram illustrating the electrical circuit comprising the automatic control system of the machine.

GENERAL DESCRIPTION

Figure 2:
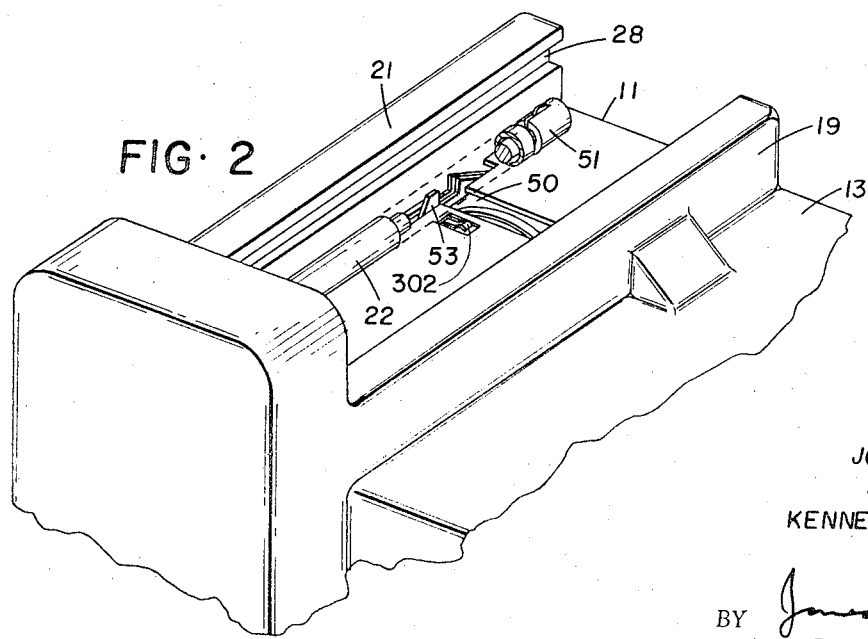
FIG. 2 is a partial perspective view of the apparatus shown in FIG. 1 taken from the left rear corner thereof, with the cartridge rack removed to illustrate the rack supporting means and the supply reel spindle.

Referring first to FIGS. 1 and 2 of the drawings, the overall projector apparatus includes a generally rectangular housing 11 supporting a projection lens assembly 12 at the forward end thereof and provided on its top wall 13 with a plurality of control members 14 through 18, the specific functions of which will be described later. Forwardly of the control members, a pair of opposed cartridge rack support rails 19 and 21 extend upwardly from the top housing wall below and at opposite sides of a horizontal spindle member 22 supported on a vertical support plate 23 at one end thereof. A cartridge rack 24 comprises a bottomless boxlike structure adapted to be supported slidably between the guide rails by means of tongue members 25 and 26 at opposite sides of the rack, which are received within corresponding guide slots 27 and 28 in guide rails 19 and 21, respectively, when the rack is loaded onto the machine as shown in FIG. 1. Along the sidewalls of the rack, a plurality of uniformly spaced pairs of ribs 29 extend inwardly to define compartments adapted to receive the individual film cartridges 31. Each cartridge is placed in one of the compartments and is supported by its hinge 32 and its latch member 33, so that a plurality of adjacent cartridges located in the rack are uniformly spaced in parallel aligned relation to one another.

As shown in FIGS. 3, 4 and 5, each of the film cartridges comprises a lower casing member 34 provided with an upper casing member 35 attached to the lower casing by hinge 32. By opening the upper casing member, which is releasably held in closed position by latch member 33 which is in locking cooperation with abutment 33a on the upper casing member, the cartridge may be loaded by simply inserting therein a conventional film reel 36, on which an elongated strip of film 37 is wound in a roll 38 with the inner end of the strip preferably being attached to the core of the reel, for example by means of a clip member 39 in a slot 41 in the hub or core portion of the reel. When the reel has thus been inserted into the cartridge, oriented such that the reel will rotate in a clockwise direction as viewed in FIG. 3 when the film is unwound therefrom, the upper casing member is closed to retain the reel in the cartridge and to protect it against accidental damage. As illustrated by FIG. 4, the reel fits fairly loosely in the cartridge with the film thereon being prevented from clockspringing beyond the edges of the reel flanges 42 by a pair of inwardly extending rails 43 in the lower casing member and by a similar structure (see FIG. 8), in the upper casing member. The cartridge and its guide rails are more fully described in U.S. Ser. No. 643,503, "Cartridge For Reel of Strip Material," filed Jun. 5, 1967. As shown at 44 in FIG. 3, the two members comprising the cartridge are provided with semicircular openings which define circular holes at opposite sides of the closed cartridge in generally coaxial relation to a grooved cylindrical hole 45 extending through the hub portion of the reel located in the cartridge. The bottom wall of the lower casing member is also provided with an elongate slot 46 shown in FIG. 5, which is adapted to accommodate portions of the film stripper mechanism, as described below, such slot being wider than the film along the portion of its length shown at 47 to allow passage of the film therethrough.

To insure that the loaded cartridges are located in the proper rotative sense relative to the machine, the cartridge rack must be installed in a predetermined manner dictated by the dissimilarity of its tongue members and the mating slots in which they are received; and each cartridge includes a tongue 48 adapted to be received within one of the corresponding notches 49 located along only one side of the cartridge rack, so that the cartridges can be installed in the rack only when they are oriented as shown in FIG. 1. In order to prevent the cartridges from falling out of the rack accidentally when the rack is removed from the apparatus, resilient latch means can be employed to retain the cartridges in their respective compartments, for example, by including in each of the notches 49 a resilient detent member (not shown adapted to engage a depression 50' along the edge of tongue 48 of the corresponding cartridge.

With the cartridge rack supported by the guide rails, the center openings in the cartridges and the center holes in the reels are aligned to receive the spindle as the rack is moved along the guide rails toward support plate 23.

As may be seen from FIG. 2, the top wall 13 of housing 11 is provided with an opening 50 between the rack support rails and below the rotatable head portion 51 of the spindle. As will be explained in greater detail, the particular cartridge which is located in projecting position is positioned directly over opening 50 with the spindle head portion received within the center hole of the reel in that particular cartridge. This is accomplished by providing the rack with a plurality of uniformly spaced legs 52 (FIG. 1), associated respectively with the corresponding cartridge compartments and adapted to be engaged by the rack advancing mechanism, partially shown at 53 (FIG. 2).

FIG. 6 shows in somewhat simplified form the arrangement of the major internal components of the overall apparatus, including a projector unit 54 associated with a takeup reel 55, and a control assembly 56 which supports and actuates various elements of the automatic film handling system.

The projector unit 54 is of the self-threading type in which the leading end of the film 37 need only be fed into the unit between guide members 57, whereupon it is engaged by a threading mechanism represented schematically by elements 58 and is thereby threaded automatically through the projector gate 59, aligned with projection lamp 61, and guided into engagement with hook members 62 on the frictionally driven rotating takeup reel 55. When the threading operation has been completed, the film advancing mechanism represented by claw 63 is engaged with the film to advance it intermittently through the gate during the projection cycle.

Additionally, the projector unit is provided with means for displaying the film in either a forward or reverse direction, as selected manually by knob 14, and at different speeds, as determined by the setting of knob 15.

Since the projection unit may be substantially similar to known manually loaded self-threading projectors capable of performing these various functions, its internal structure is not illustrated or described in detail. However, an appropriate example of a commercially available unit of this type is the well-known 8mm. motion picture projector sold by the Eastman Kodak Company, Rochester, N.Y., U.S.A., under the trademark INSTAMATIC M90.

In FIG. 6, the illustrated film magazine or cartridge is shown in the projection position in which the reel therein is directly over opening 50 and in vertical alignment with film guide members 57 atop the projector unit. A control assembly 56 is mounted above the projector unit and includes a film stripping mechanism comprising a movable film roll driving device 64 and a movable stripper device 65. These two devices are supported by the control assembly adjacent end wall 66 thereof, with the film roll being accessible to the roll driving device 64 through slot 46 in the cartridge by means of opening 50 in wall 13. Similarly, access is provided between the roll and finger member 67 of device 65 by way of opening 68 in support rail 19 and the contiguous opening 69 in the adjacent wall of the cartridge rack (FIG. 1).

CONTROL ASSEMBLY DRIVE MEANS

Figure 7:
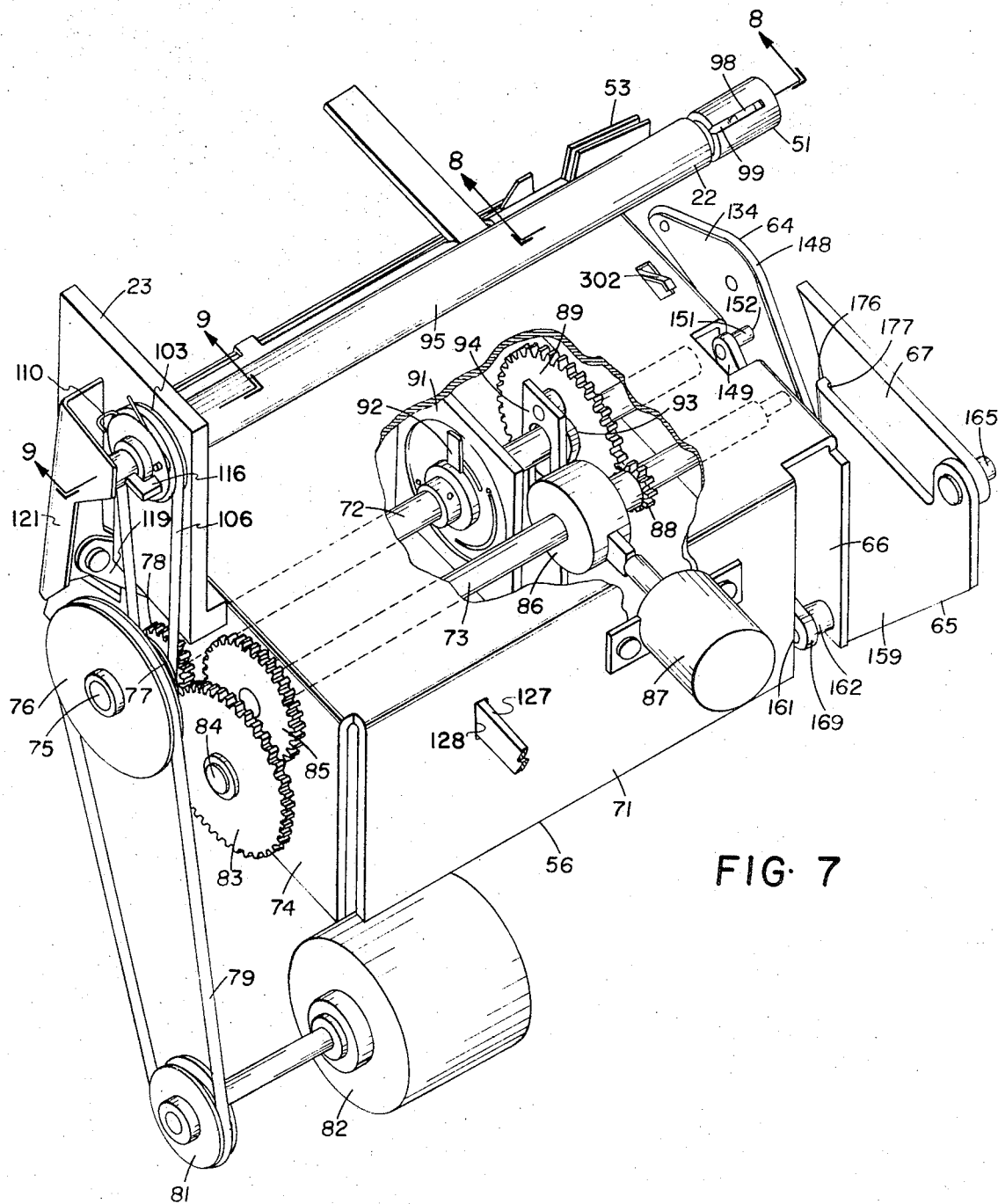
FIG. 7 is a perspective view of the multiple reel advancing, threading and winding control assembly of the machine, taken from the left rear corner thereof and partially broken away to illustrate the means employed for transmitting rotational movement to the camshaft and spindle components thereof.

FIG. 7 shows the control assembly 56 removed from the machine housing. This assembly comprises a boxlike support frame 71 to which are mounted reel spindle support plate 23, the film roll driving and stripping devices 64 and 65, and the rack advancing mechanism 53, whereby the assembly including all of these components can be assembled and thereafter installed and removed from housing 13 as an integral unit. In addition to providing support means for such components, the assembly also includes power operated drive means for effecting appropriate movements thereof in timed sequence.

The power operated drive means included in the control assembly comprises a camshaft 72 in parallel relation to a drive shaft 73, both of such shafts being rotatably supported at their opposite ends by the end wall members 74 and 66 of the support frame member. Beyond end wall member 74, the end of the camshaft provides a gudgeon 75 which supports rotatably thereon a unitary pulley and gear member comprising an outer sheave 76, an intermediate sheave 77 and a pinion gear 78. The outer sheave 76 of the pulley and gear member is connected by a drive belt 79 to pulley 81 on an electric motor 82, which runs continuously during the operation of the apparatus and which may also serve to provide power to the projector unit 54 by means not shown. Pinion gear 78 is in meshing engagement with a larger idler gear wheel 83 which is freely rotatable on stub shaft 84, and to which is attached another small pinion, not shown, meshing with gear wheel 85 attached to the end of drive shaft 73. Therefore, the continuous rotation of the pulley and gear member, in a clockwise direction, as seen in FIG. 7, causes the drive shaft also to rotate continuously in the same direction but at a slower speed.

A single revolution clutch mechanism, of conventional design, is mounted on the drive shaft 73 as shown at 86 and is actuated by a solenoid 87 to couple pinion 88 to the drive shaft during successive complete revolutions thereof so long as the solenoid remains energized. Pinion 88, in turn, is meshed with gear wheel 89 attached to camshaft 72, with the gear ratio of the two gears being such that each revolution of pinion 88 rotates the camshaft through a quarter revolution. Accordingly, as seen in FIG. 7, energization of the solenoid causes the camshaft to rotate by 90° increments and to come to rest after completing any such incremental movement during which the solenoid is deenergized. If the solenoid is energized and then immediately deenergized, i.e., "pulsed," it is apparent that a single 90° rotational movement of the camshaft is thereby effected.

A rotary switch mechanism is located along the camshaft and includes a stationary contact plate 91 in cooperation with an adjacent rotor member 92 affixed to the shaft. The switch mechanism comprises an element of the electrical operational sequence controlling system which will be described later in detail. Also, the camshaft is provided with a number of cam members which operate various mechanical components of the apparatus. One of these cam members is shown at 93 in cooperation with a cam follower slide 94. This cam follower slide is linked to the projector unit to open and close the projector gate 59 and to move claw 63 into and out of the film path as a function of the angular position of the camshaft. For purposes of clarity, the other cam members located along the camshaft have been omitted in FIG. 7, but are illustrated in those figures pertaining to the specific mechanisms with which each of such cams is associated.

SPINDLE DRIVING MEANS

Figure 8:
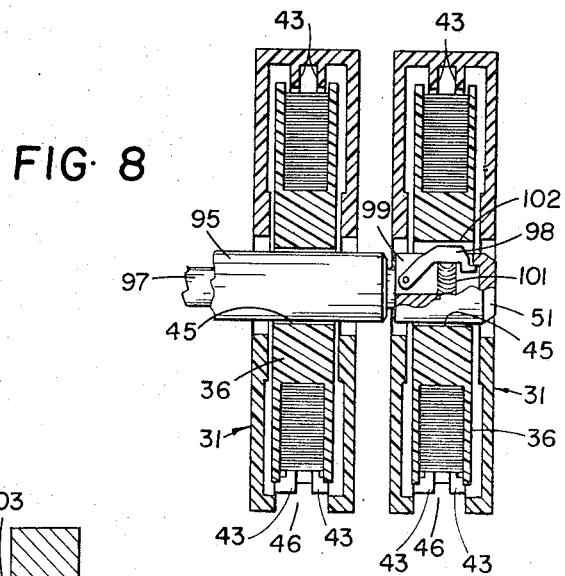
FIG. 8 is a partial vertical cross-sectional view of the spindle member taken along the line 8–8 of FIG. 7 through two cartridges that are located on the spindle, one of the supply reels being shown in driving engagement with the rotatable head portion of the spindle.
Figure 9:
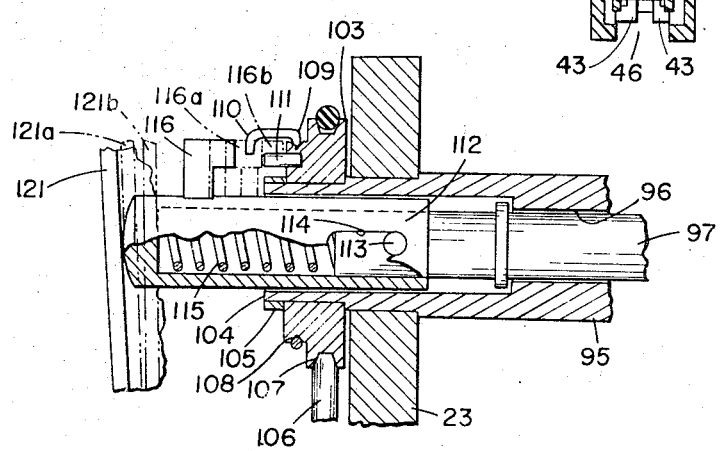
FIG. 9 is a partial vertical cross-sectional view along the line 9–9 of FIG. 7, showing the construction of the spindle clutch mechanism.
Figure 10:
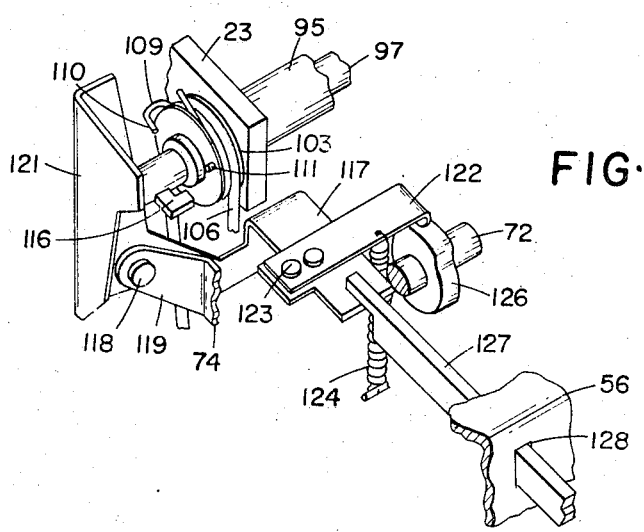
FIG. 10 is a partial perspective view from the same viewpoint as FIG. 7, showing the spindle clutch control mechanism.

Referring now to FIGS. 7 through 10, the horizontal reel spindle member 22 comprises a tube 95 which extends through and is rigidly attached to support plate 23 as shown in FIG. 9. The internal bore 96 of tube 95 rotatably supports spindle shaft 97 located therein. At the unsupported end of the tube, shaft 97 is attached to the rotatable spindle head member 51, shown in detail in FIG. 8. The head member is of substantially the same external diameter as the tube and includes a pivotally supported latch member 98 located in slot 99 and urged outwardly by a spring 101. Accordingly, when a cartridge is in the projection position, the spindle head member is received within the center hole 45 of the corresponding reel, and is coupled in driving relation to the reel by the engagement of the latch member with one of several axial spline slots 102 extending along the central reel hole, as best shown in FIG. 3. As is also depicted by FIG. 8, the reel in a cartridge positioned beyond the projection position toward support plate 23 is supported loosely by the stationary spindle tube 95 extending through the center hole therein.

As mentioned briefly in the foregoing summary of the invention, the film supply reel engaged by the spindle head member is rotated in a rewinding direction, either by positive or frictional spindle driving means or may be allowed to rotate freely independently of such drive means, in accordance with the particular operation being performed by the apparatus during its operating cycle. These three modes of reel rotation are established selectively and in predetermined sequence by means of the structure shown in FIGS. 9 and 10, comprising a spindle clutch mechanism and a clutch actuating mechanism operated by camshaft 72. As is best shown in FIG. 9, the clutch mechanism includes a pulley member 103 rotatably supported influence plate 23 on the end portion 104 of the stationary spindle tube 95, and retained thereon by a collar 105. A belt 106 received in pulley groove 107, is connected to the intermediate sheave 77 of the pulley and gear member shown in FIG. 7, whereby member 103 rotates continuously in a clockwise direction as viewed in FIG. 10. An annular groove 108 about the hub of the pulley member accommodates a resilient wire clip member 109, one end of which extends away from the pulley member and is bent inwardly toward the axis of the spindle as shown at 110, beyond the end of pin 111 projecting axially from the pulley hub. A tubular casing 112 extends into the bore of tube 95 and is rotatively coupled to the end of spindle shaft 97 by a pin 113 extending through an elongate slot 114 in the casing and through the end of the spindle shaft received therein. The casing is urged toward the position shown in FIG. 9 by an internal compression spring 115 located between the end of the spindle shaft and the closed end of the casing, but can be moved axially against the influence of the spring without effecting the rotative driving relation between the casing and the spindle shaft. When the casing is in the neutral clutch position shown in FIGS. 9 and 10, lug 116 projecting radially therefrom is beyond the circular paths of movement of both end portion 110 of the clip member and pin 111, so that the spindle shaft and the film reel engaged by its head member are freely rotatable independently of the continuous rotation of the pulley member. If the casing is moved inwardly to the slip clutch position, in which the lug is located as shown at 116a, the lug will be engaged by the end 110 of the continuously revolving clip member to rotate the spindle shaft and the engaged reel in the same direction, i.e., in the direction in which film is wound onto the reel. It should be noted though, that when the lug is so engaged with the clip member, only a predetermined amount of torque can be transmitted from the pulley member to the spindle shaft, as determined by the resilient frictional engagement between the clip member and the adjacent surfaces of groove 108. When the casing is moved further toward the spindle shaft to the positive or rewind clutch position, the lug moves to the position shown at 116b where it is engaged by pin 111, thereby coupling the pulley member and the spindle shaft in positive driving relation.

To adjust the casing member automatically to its appropriate position during different phases of the operating cycle of the apparatus, a shifting arm 117 is attached pivotally by a stud 118 to a bracket 119 extending from end wall member 74 of the support frame. Adjacent the closed end of casing 112, the shifting arm defines an abutment plate 121 adapted to engage the casing to move it inwardly as the arm is rotated in a clockwise direction about its pivot point as viewed in FIG. 10. Interiorly of the support frame member, the shifting arm extends above camshaft 72 and supports a resilient cam follower blade 122 attached to the arm by rivets 123. A coil spring 124 is attached at its lower end to a stationary pin and at its upper end to the blade 122. This spring biases the arm in a clockwise direction about stud 118 to maintain the blade in contact with clutch control cam 126 on camshaft 72 by moving casing 112 against the influence of spring 115, but is of insufficient strength to produce any significant flexing of the blade. Cam 126 includes peripheral surface areas of three different radii, each of such areas being adapted when engaged by the cam follower blade, to locate the abutment plate at an angular position corresponding to one of the three modes of operation of the clutch mechanism, as shown at 121, 121a and 121b. While the illustrated profile of cam 126 is not necessarily appropriate to actuating the clutch mechanism in proper timed sequence, as is also the case with regard to the various illustrations of other cams employed in the apparatus, it will be understood that an appropriately profiled cam can thus be used to adjust the clutch mechanism automatically to perform its required functions during different phases of the normal apparatus cycle as a function of the angular position of the camshaft.

During the usual film projecting phase of the operating cycle of the apparatus, the portion of cam 126 of greatest radius is in contact with blade 122, thereby raising the blade to its highest position to release the spindle from engagement with pulley member 103 so that the film reel can rotate freely as film is unwound therefrom. However, if it is desired to project the film backwards, this is accomplished during the same phase of the operating cycle but requires the clutch to frictionally drive the supply reel in a rewinding direction. Therefore, to override the neutral clutch adjustment established by cam 126 during this operating phase, a lever 127 engages the end of shifting arm 117 adjacent the blade and extends through an opening 128 in the support frame, which provides a fulcrum for the lever. Beyond the support frame the opposite end of the lever is connected to a linkage shown at 129 in FIG. 6, which raises that end of the lever and adjusts the film advancing claw mechanism of the projector unit when control knob 14 is manually set to the reverse projection position. Accordingly, the end of lever 127 adjacent arm 117 forces the arm downwardly by flexing the resilient cam follower blade so that the arm assumes a position in which the clutch mechanism is shifted to frictionally engage the pulley member with the spindle shaft. When knob 14 subsequently is returned to its forward projection setting, the lever is restored to its former position out of overriding engagement with the shifting arm and the cam follower blade reassumes its previous unflexed condition.

FILM STRIPPING MECHANISM

The film stripping mechanism, which was described briefly in connection with FIG. 6 and which is also shown in FIG. 7, is illustrated in detail in FIGS. 11, 12, and 13. As was mentioned earlier, this mechanism comprises a film roll driving device 64 and a stripper finger device 65, each of which is movable between a retracted position, as shown in FIGS. 6, 7, and 12, and an operative position in engagement with the film roll 38 on the reel located in the cartridge aligned with the mechanism, as shown in FIG. 11. The finger member 67 passes between and is guided by the pair of inwardly extending rails 43 in the lower casing member.

The film roll driving device includes a drive belt assembly, illustrated in exploded relation in FIG. 13, comprising a driving pulley 131, a guide pulley 132 and a guide pulley 133. The pulleys are mounted between side plates 134 and 135, which are held in position by pins 136 and 137 extending respectively through corresponding holes 138 and 139 in the side plates and through the slightly larger center holes 141 and 142 of pulleys 132 and 133, whereby those two pulleys can rotate on the pins. The end of drive shaft 73 extends through end wall 66 of the support frame adjacent the stripping mechanism and is reduced in diameter as shown at 143. This smaller end portion of the drive shaft extends freely through holes 144 in the side plates at opposite sides of pulley 131 but is engaged tightly by the center hole 145 in that pulley to prevent rotation of the pulley relative to the drive shaft. Accordingly, the pulley assembly is retained in angularly movable relation on the end of the drive shaft by pulley 131 in cooperation with stud 146 pressed into hole 147 in the end of the shaft. With the device so assembled, a resilient drive belt 148 of generally circular cross section, e.g., a so-called "O-ring," is stretched around the pulleys and projects beyond the upper edges of the side plates. Inasmuch as the drive shaft rotates continuously during the operation of the apparatus, in a counterclockwise direction as shown in FIGS. 6 and 11 through 13, it is apparent that the belt is driven continuously in a corresponding direction regardless of the angular position of the drive belt assembly.

Behind end wall 66 of the support frame, an angular cam follower member 149 is pivotally supported on drive shaft 73. The upper leg of the cam follower is attached to side plate 134 by a pin 151 received in a hole 152 therein, (also shown in FIG. 7), with the lower leg of the follower member being provided with a cam follower stud 153. A spring 154 is attached to the lower leg of the follower member and urges it in a counterclockwise direction to bias stud 153 toward engagement with stripper control cam 155 on camshaft 72. Therefore, when the cam is in the position shown in FIG. 12, the drive belt assembly is retracted by the engagement of stud 153 with the outer peripheral surface 156 of the cam. When the cam has moved to the position shown in FIG. 11, however, the notched portion 157 of the cam is aligned with cam follower stud 153, allowing the follower member to be rotated by spring 154 to move the drive belt assembly to its illustrated position in which belt 148 thereof engages the outer convolution of the film roll 38. It should be noted in FIG. 11 that stud 153 is in spaced relation to the innermost peripheral surface of the notched portion of the cam, whereby the drive belt assembly could move still further to engage a smaller film roll wound on the reel.

The stripper finger device comprises a support plate 159 pivotally mounted to end wall member 66 by a pin 161 secured to the support plate and extending through a bushing 162 in the wall member as shown in FIG. 7. The end of pin 161 extending outwardly from the support frame also serves as a pivotal support for a snubber member 163 and for a film guide roller 164 which spaces the snubber member from the support plate. The stripper finger member 67 is attached to support plate 159 by a stud 165 and is biased to rotate in a counterclockwise direction thereon by a hairpin spring 166, the opposite legs of which engage pins 167 and 168 on the support plate and the finger member, respectively.

Adjacent the inner side of end wall member 66, a lever 169 is attached to pin 161 and is provided with an elongate slot 171 in which is received a pin 172 on cam follower arm 149. By this arrangement, the position of the stripper device is coordinated with that of the film roll device so that both devices are moved simultaneously to their respective positions shown either in FIG. 11 or in FIG. 12 in response to movement of cam 155.

As a loaded reel is moved into the projection position, the elements of the stripping mechanism are initially positioned as shown in FIG. 12, out of the path of the cartridge rack, with upward rotational movement of finger member 67 being limited by its engagement with a rib 173 extending downwardly from housing wall member 13. Contrary to FIG. 12, however, the film is of course wound entirely upon the reel in its cartridge at this stage of the operating cycle. When the reel has been positioned properly, cam 155 initiates the film stripping operation by allowing the drive belt, and stripper finger devices to assume the positions shown in FIG. 11. Shortly before this occurs, however, the clutch control mechanism shifts the clutch device to its friction drive condition to rotate the reel rapidly in a counterclockwise direction, so that excess slack in the film roll is absorbed due to the rapid acceleration of the reel and the inertia of the loose film convolutions. By the time the driving belt engages the film roll, the clutch is in the process of being shifted from its frictional mode of operation to its neutral condition, but, during a short interval, the film roll is under the opposite rotational influences of both the spindle and the driving belt, thus causing additional tightening of the film roll if excess slack is still present. When the roll has become tightly wound, the torque exerted thereon by the drive belt overcomes the opposite torque of the frictionally driven spindle head member, allowing the reel to be driven by the belt prior to the completion of the clutch disengagement process.

As the simultaneous movement of the support plate allows the stripper finger to assume its illustrated position below the film roll, finger member 67 is no longer restrained by rib 173 or by contact with the adjacent surfaces of the cartridge rack (FIG. 3), and is therefore moved upwardly between ribs 43 by spring 166 to position its pointed end 174 against the film roll. Therefore, the leading end of the film on the rotating film roll is engaged by the finger and guided downwardly away from the roll by the inner edge surface 175 of the finger.

In order to establish a continuous path along which the leading end of the film is guided from the roll and fed into the projection unit between guide members 57, a film guiding lip 176 extends upwardly along the edge of support plate 159 and is notched at its upper end, as shown at 177, to receive the edge of the guide finger (see also FIG. 7). Thus, a smooth uninterrupted guide surface is presented to the adjacent side of the film regardless of the angular position of the stripper finger relative to the support plate. Opposite the guide surface so established, the moving drive belt provides guiding support for the leading end of the film as it first leaves the roll. Below belt driving pulley 131, the snubber member supports a rotatable roller 178 in tangential relation to an inwardly bent guide lip 179 extending between that roller and the similar roller 164 at the pivot point of the snubber member. With the snubber member 163 resiliently held in fixed position relative to the support plate by spring member 181a, urging arm 182 into resilient contact with ear 183, it is therefore apparent that the drive belt cooperates with the two rollers and the guide lip to define generally continuous guide surfaces opposite those established by the stripper finger and the support plate. Consequently, as the film is unwound from the reel by the drive belt, its leading end progresses along the path so established and is fed between guide members 57 for engagement by the threading mechanism within the projector unit.

When the film has been threaded through the projector unit, as detected by the arrival of its leading end at the film gate, the camshaft rotates to cause the stripping devices to return to their respective retracted positions. Such movement positions the snubber guide member as shown in FIG. 12, so that the upper roller 178 thereof defines the path of the film as it moves between the reel and the projector unit. Since this roller can move laterally if the film tension is sufficient to overcome the resiliency of the relatively weak spring member 181a, this arrangement serves to stabilize the tension in the film, as is well known in the projector art.

A flexible member 181 serves as a movable contact element of a normally open switch comprising that element and contact member 184, whereby the switch is closed if the tension in the film becomes great enough to move the flexible member 181 into contact with the adjacent contact member 184. As will be explained in connection with the overall electrical system of the machine, this switch can therefore be employed to signal the end of the projection phase of the operating cycle, at which time the film is drawn tight between the projector unit and the supply reel.

FIGS. 14 and 15 illustrate the construction of the rack advancing and positioning mechanism, which was mentioned previously in connection with FIGS. 1 and 2. This mechanism includes a lever assembly supported by the front wall member 185 of the support frame, as shown in FIG. 14, with the various components of the lever assembly being shown in exploded relation to one another in FIG. 15. The innermost rack positioning lever 186 is located against front wall member 185 and is pivotally attached thereto by a stud 187. At its opposite free end, the lever defines a vertical edge surface 188 between a sloped upper edge surface 189 and a notched edge area 191. A spring 192 is looped about stud 187 and engages an ear 193 on the lever and a pin 194 on wall member 185 to bias the free end of the lever upwardly to a position in which the notched edge portion of the lever engages lever guide strap 195 extending from the support frame. A second rack positioning lever 196 is pivotally attached to the above-described lever by stud 197 and, similarly, is provided with a spring 198, the opposite legs of which engage pin 199 and the end of stud 187 to bias the free end of the lever to the position in which edge surface 201 thereof abuts against strap 195.

A slide plate 202 is supported against lever 196 for lateral sliding movement by a forwardly extending angular lug 203 received in notch portion 204 of the slide plate and by an ear 205 extending rearwardly from rack advancing lever 206 and received in a similar notch 207 located toward the opposite end of the plate. To retain the strap in such supported position, its upper edge surface 208 is located adjacent guide strap 195, which prevents vertical movement thereof.

The end of the rack advancing lever adjacent guide strap 195 is similar in profile to the corresponding end of lever 186, including a sloped upper edge surface 209 and an adjacent vertical edge surface 211. At its opposite end, lever 206 is supported in pivotable fashion by a projection 212 extending through an opening 213. Like the free ends of the rack positioning levers, the free end of the rack advancing lever is biased upwardly against strap 195 by spring 214, the opposite legs of which engage ear 215 on the lever and pin 216 on wall member 185. Projection 212 comprises one end of cam follower arm 217, which extends through an elongate horizontal slot, not shown, rearwardly adjacent the corresponding end of lever 206. The cam follower arm is pivotally supported by stud 218 on saddle member 219 riding on camshaft 72 at a fixed position there along. The cam follower shoe 221 at the other end of the follower arm is maintained in resilient contact with the periphery of the rack advancing and positioning cam 222 on the camshaft by means of spring 223. As viewed in FIG. 14, it is therefore apparent that rotation of the cam from its illustrated position (in a clockwise direction) will cause the rack advancing lever to move to the left as the cam follower shoe remains in contact with the spiral surface 224 of the cam, and that the lever will return rapidly to its illustrated position under the influence of spring 223 as the cam continues its rotation with the shoe in engagement with the relatively steeply sloped cam surface 225. Throughout such movement of the rack advancing lever, however, it continues to be biased upwardly at its free end by spring 214, which slides along pin 216 as the spring moves with the lever.

With the levers positioned as shown in FIG. 14, vertical edge surfaces 188 and 211 of the respective levers 186 and 206 are opposed to the similar vertical edge surface 226 of lever 196. As shown in FIGS. 2 and 6, these opposed edge surfaces extend upwardly through and beyond top wall member 13 of housing 11 in the path of legs 52 on a cartridge rack supported by support rails 19 and 21. The distance between the opposed edge surfaces corresponds to the width of each of the rack legs, whereby the reception of one of the legs between such surfaces causes it to be latched to immobilize the rack so that a cartridge housed in the corresponding compartment is located at the projection position. Referring again to FIGS. 1 and 14, as lever 206 moves to the left in response to rotation of the cam, its free end is cammed downwardly by the engagement of its sloped upper surface 209 with the rack leg to the left of the one which continues to be engaged and held in fixed position by levers 186 and 196. As such movement of lever 206 continues, however, ear 205 thereon engages edge 227 of notch 207 in the slide plate and moves the plate along with the rack advancing lever. When lever 206 approaches the end of its leftward movement, the sloped edge surface 228 at the side of notch 204 engages angular lug 203 and cams the free end of lever 196 downwardly, against the influence of spring 198, and out of engagement with the rack leg, so that the rack is free to slide toward the right side of the machine. By the time lever 206 is in its extreme left position, such release of the cartridge by lever 196 has been accomplished and edge surface 211 of the rack advancing lever has moved past the next leg, allowing the lever to return to its raised position with surface 211 now being located in engaging relation to the left side of that leg. Therefore, as further rotation of cam 222 brings the sloped surface 225 thereof into alignment with follower shoe 221, to cause lever 206 to move back toward its former position, the rack is also moved thereby, through a distance corresponding to the spacing of the adjacent cartridge compartments.

During such movement of the rack, the leg engaged by lever 206 encounters the sloped upper surface 189 of lever 186, which is thereby cammed downwardly out of the path of the leg. Also, before lever 206 reaches its initial position, ear 205 thereon engages side surface 229 of notch 207 to move plate 202 along with the rack advancing lever, whereby angular lug 203 reenters notch 204. This allows lever 196 to return to its raised position in which its vertical edge surface 226 is aligned with the leg being advanced into latching position. Therefore, at the final stage of its return movement, the rack advancing lever moves the engaged rack leg simultaneously into contact with surface 226 and past surface 189 of lever 186, which returns to its raised position, thereby trapping the leg between the opposing vertical lever surfaces 188 and 226. Each revolution of the camshaft causes this operating cycle to be repeated to bring the cartridge in the next cartridge compartment into projection position. When the last cartridge compartment has been so positioned, further movement of the rack causes the rack advancing mechanism to be disabled as the rack engages and depresses button 231 to open a normally closed switch comprising contact blades 232 and 233 associated with the electrical control system of the apparatus.

To enable the rack to be removed and replaced, or, to allow it to be moved manually to locate any desired cartridge in the projection position, means must be provided for moving the levers manually out of the path of the rack legs. However, it is also important to insure that such manual movement of the rack can be accomplished only when the film and the film stripping devices are out of the path of movement of the rack, i.e., only at the end of each operating cycle after the film rewinding operation has been completed and before the film stripping phase of the subsequent cycle has been commenced. These objectives are achieved by a manual override device comprising an arm 234 extending through a vertical slot 235 in front wall member 185 of the support frame adjacent the top surfaces of the rack advancing and positioning levers. The arm is pivotally and slidably supported on camshaft 72, which extends through an elongate slot 236 therein and is urged in a forward direction by spring 237 to maintain cam follower ear 238 in contact with override interlock cam 239 on the camshaft. The forward end of the arm is located directly below the manual override pushbutton 241 extending through top wall member 13 (FIGS. 1 and 6). During those phases of the operating cycle when manual movement of the rack must be avoided, the cam follower ear is in engagement with peripheral surface 242 of cam 239, whereby the arm remains in its illustrated position with its forward end extending above blocking projection 243 to prevent depression of the arm by means of pushbutton 241. When the apparatus is at a phase of its operating cycle appropriate for manual movement of the rack, as determined by the angular position of the camshaft, cam 239 is positioned such that the arm has been moved out of alignment with projection 243 by the engagement of cam lobe 244 with ear 238. Therefore, the pushbutton can then be depressed, to move the free end of the arm downwardly, whereby the ends of the adjacent levers are retracted out of the path of the cartridge rack legs.

After being advanced, either manually or automatically, the rack should be at a latched position before the subsequent cycle is commenced to prevent possible machine damage, particularly to elements of the stripper mechanism. Therefore, an insulated movable contact arm 245 extends immediately below rack advancing lever 206 and lug 246 on lever 196 and is moved out of contact with a stationary contact arm 247 if either of these levers is depressed from the position which it would normally assume at this stage of the apparatus cycle, as shown in FIG. 14. Accordingly, by incorporating the normally closed switch comprising arms 245 and 247 in the electrical system of the apparatus as described below, the initiation of a subsequent cycle is prevented if a cartridge is present but improperly located as reflected by the depression of either of two levers 196 and 206.

FIG. 16 shows diagrammatically the sequential relation in which various functions of the apparatus are effected respectively by the unitary rotation of cams 93, 126, 155, and 222, mounted on camshaft 72. As shown below, the word "Start" in the diagram, at the end of a completed operating cycle of the apparatus, the cartridge rack has been advanced to locate a loaded cartridge in the projection position; the film gate is closed and the claw entered into film engaging position; the slip clutch is engaged; and the stripper mechanism is retracted. Also, during this portion of the cycle only, the override interlock cam is so positioned as to allow manual movement of the rack. As previously explained, energization of solenoid 87 causes the camshaft to rotate through successive 90° quadrants in a clockwise direction as viewed in FIG. 6 et al. Accordingly, the complete operating cycle of the apparatus comprises four successive phases, corresponding to such successive rotational movements of the camshaft. In the diagram, the sequence of operations performed by each of the mechanism control cams is shown in a clockwise direction along the corresponding identified circle, with a quadrant of the circle associated with each particular function being representative of the angular movement of the respective cam during the performance of that function. Therefore, bearing in mind that the camshaft rotates only intermittently during the apparatus cycle and that various threading, projecting and rewinding operations may continue during the intervals between successive movements of the camshaft, the sequence in which all of the various apparatus functions are performed should be apparent from the diagram.

FIG. 17 shows schematically that portion of the electrical system of the apparatus associated with the various mechanisms which characterize the invention, omitting for purposes of clarity such conventional projector elements as the projector lamp and the motor 82, which obviously can be incorporated in the overall circuit by customary means.

The central element of the illustrated circuit is a rotary switch comprising a conductive rotor member 92 rotatable by camshaft 72 in a clockwise direction into contact with contact elements 248 through 252 on stationary contact plate 91, shown in FIG. 7. The secondary winding of a line voltage reducing transformer 253 is grounded at one end and connected at its other end to the rotor through a normally closed automatic disabling switch comprising contact members 232 and 233. Solenoid 87 is also grounded at one side and is connected at its opposite side to contact element 248 through manual operation switch 254, frame speed switch 255 and the rack position switch comprising contact arms 245 and 247. The rack position and automatic disabling switches have been described previously and are both closed at the end of a complete operating cycle if the rack is in a latched position and not yet advanced into engagement with button 231. The frame speed switch is actuated by knob 15, which allows the operator to select different projection speeds, e.g., 6, 18, or 54 frames per second providing slow motion, normal, or fast projection respectively. This switch is open unless the knobs 14 and 15 are set to effect forward projection at normal speed and therefore requires the film advancing mechanism to be operating at normal speed when the threading phase of the cycle is started to insure proper performance of the threading operation, whereafter the knob can be adjusted to other speed settings during the film projection phase of the cycle. The manual operation switch is simply a toggle switch as shown at 18 in FIG. 1, which is closed during automatic operation of the projector. If the operator desired to move the rack manually at the end of the cycle then in progress, this switch is moved to its open "manual " position to stop the machine when that cycle is completed, at which time the pushbutton 241 can be depressed to allow manual movement of the rack.

Assuming that the rotor is in the "Start" position, aligned with contact element 248, and that the various switches mentioned above are all closed, the circuit is completed to energize the solenoid. Accordingly, as the camshaft advances through a quarter revolution, the solenoid energization is terminated as the rotor disengages contact element 248, and the various cams perform their respective functions as shown in FIG. 16.

When the camshaft has completed its movement through this first rotational phase, rotor 92 is in the "Thread" position in alignment with contact elements 249 and 250. During the completed previous operating phase, the stripper mechanism normally will have engaged the film roll in the cartridge in projection position and will have moved the free end of the film into engagement with the automatic threading mechanism of the projector unit. However, referring to FIG. 11, if an empty rack compartment or an empty film reel happens to be in the projection position, the roll film driving device moves upwardly beyond its illustrated roll engaging position, thereby moving arm 149 into engagement with a movable contact arm 256 and displacing that arm into contact with the adjacent stationary contact arm 257. These two contact arms comprise the empty reject switch shown in FIG. 17. Therefore, if this switch is closed with the rotor in the "Thread" position, the solenoid is again energized through contact element 249 to advance the camshaft through its second movement phase, bringing the rotor to the "Project" position. Similarly, if the operator wishes to bypass the cartridge then in projecting position, he can depress pushbutton 17 (FIG. 1) to close the normally open manual reject switch 258, thereby energizing the solenoid through contact element 250. Assuming, however, that the reject switches are both open and that the film has been fed into the projector mechanism, the camshaft will remain in the "Thread" position until the arrival of the film within the film gate causes the resilient movable pole member 261 of the gate switch to be displaced by film sensing finger 262 into contact with contact member 263. Thereupon, the solenoid is again energized, causing the camshaft to advance the rotor to the "Project" position in which it simultaneously engages contact elements 250, 251 and 252. If the manual reject switch remains closed, the continuing energization of the solenoid through contact element 250 will allow the camshaft to advance automatically to the "Rewind" position. Similarly, if film is not present at the gate, as in the case of an empty or absent cartridge, the arrival of the rotor at the "Project" position will energize the solenoid through contact element 252 in series with the closed switch comprising gate switch member 261 in contact with the adjacent switch member 264. During a normal operating cycle, however, the camshaft will remain at the "Project" position until the solenoid again is energized through contact element 251 by the closing of a normally open rewind switch comprising arm members 181 and 184, in response to the movement of snubber member 163 when the film is drawn taut upon being unwound entirely from the supply reel. Alternatively, this function might be performed by the gate switch by providing the trailing end of the film with a side notch detectable by finger 262, in which case the rewinding operation could be initiated as the end of the roll is approached but without subjecting the film to increased tension at the end of the projection phase.

If the film gate is empty when the rotor advances from the "Project" position, as will be the case if either of the reject switches has functioned, the solenoid remains energized through contact element 252 and the rotor proceeds to the initial start position. Normally, however, the rewinding operation has just commenced when the rotor reaches the "Rewind" position with further energization of the solenoid being delayed until the gate switch member 261 engages the corresponding switch member 264 in response to the departure of the film from the gate. When the rotor again arrives at the start position, the cartridge has been rewound and advanced out of the projection position, whereupon a subsequent cycle is initiated automatically unless one of the various previously described switches in series with contact element 248 has been opened.

When the cycle has been repeated a sufficient number of times to move the rack to the end of its movement path, the disabling switch is opened to prevent further cycling until the rack is replaced or repositioned. If desired, this switch, or its equivalent can also serve to open the line voltage circuit to completely disconnect the machine from its power source, but this function is performed preferably by a separate switch, not shown, which may be operated manually by means of knob 16 or its equivalent, to allow the projector lamp and the customary motor driven lamp cooling means to remain energized as the rack is replaced or repositioned.

Cartridge 31 may be provided with a coded indication, such as the presence or absence of a notch 300 (FIGS. 3, 6, 11, and 12), cooperative with suitable detecting means of the projector to provide a control function in the system. For example, if a cartridge contains a sound film, the absence of a notch 300 may be utilized to turn a sound system 304 (FIG. 17) on. More specifically, a resilient detector finger 302 may be suitably supported on the projector housing along the path of movement of the cartridge rack and positioned to be displaced by the cartridge surface present in the absence of a notch 300 to close a normally open switch 306 (FIG. 17). The switch 306 may be connected in series with the projector sound system 304 in the manner depicted in FIG. 17 to thus energize the sound system when it is actuated to a closed position.

If a cartridge contains a nonsound film, the presence of a notch 300 can be utilized to prevent actuation of the switch 306. In this instance, the detector finger 302 will not be displace due to the absence of the cartridge surface which is necessary to displace it. Accordingly, the sound system 304 will not be turned on.

It will be thus apparent that by suitably biasing the switch 306 to an open position, the detection means can be arranged to automatically sense the code indication on each and condition the projector system accordingly.

Although the foregoing description refers to a specific embodiment of the invention comprising a fully automatic apparatus, such as a cinematographic projection apparatus, it should be understood that the various components which are combined in the apparatus are not limited in novelty or utility to such an overall combination but may be employed advantageously in other types of apparatus, either independently or in various combinations or subcombinations with one another. Accordingly, the illustrations and description of the invention are to be considered as illustrative only and not as limiting the scope of the invention.

We claim:

1. A device for withdrawing from a reel the free end of an elongate web of strip material comprising a roll wound upon said reel, said device comprising:
   a. support means for rotatably supporting said reel at a predetermined position;
   b. reel drive means engageable with said reel for rapidly imparting rotation to said reel in a winding direction;
   c. roll drive means engageable with the outer convolution of said roll for rotating said roll and thereby said reel in an unwinding direction;
   d. a member engageable with said outer convolution to intercept and guide the free end of said web away from said roll and said reel as said roll is rotated in an unwinding direction by said roll drive means; and
   e. control means for operating said reel drive means and said roll drive means in sequence whereby winding rotation is rapidly imparted to said reel to tighten loose convolutions of said roll prior to the engagement of said roll by said roll drive means.

2. The invention defined by claim 1 in which said roll drive means comprises a moving endless belt movable into frictional engagement with said roll on said reel.

3. The method of removing the external free end of an elongate strip of web material from a roll of such material wound on a core member, said method comprising the sequential steps of:
   a. rapidly imparting rotation to said core member in the direction in which said strip is wound thereon;
   b. subsequently applying a rotative force directly to the outer convolution of said roll to rotate said roll and thereby said core member in the direction in which said strip is unwound therefrom; and
   c. guiding the free end of said strip away from said roll while said roll is rotating in an unwinding direction.

4. A device for stripping and feeding thin, flexible strip material from a roll of such material, the material having a leading end that tends to separate from the roll during rotation of the roll in an unwinding direction, the device comprising:
   means for supporting the roll for rotation about an axis;
   yieldable roll drive means adapted to be coupled to said roll and operable when coupled to the roll to yieldably drive the roll in a direction for winding said material on the roll;
   coupling means for selectively coupling and uncoupling said drive means from said roll;
   friction drive means for said roll comprising an endless drive belt movable into and out of frictional engagement with the roll, means for driving said belt in a direction to drive the roll in a direction for unwinding material from the roll when the belt is in engagement with the roll, said friction drive means being capable of overriding the force of the yieldable roll drive means for driving the roll in a direction to unwind material from the roll even when said yieldable drive means is coupled to the roll; and
   control means coupled to said coupling means and to said friction drive means for (1) coupling the yieldable drive means to the roll for a predetermined time interval to yieldably drive the roll in a direction for winding material onto the roll, thereby to tighten loose convolutions of material on the roll, initiating operation of said roll drive means between the beginning and the end of said time interval to rotate the roll in a direction for unwinding material from the roll, and (3) uncoupling the yieldable drive means from the roll.

5. A device for stripping and feeding strip material from a roll of such material having a leading end, the roll being wound on a reel and being rotatable with the reel about an axis, and the material having a leading end that tends to separate from the roll during rotation of the roll in an unwinding direction, the device comprising:
   a spindle engageable with the reel for rotatably supporting the reel and the roll;
   spindle drive means adapted to be coupled to said spindle and operable when coupled to the spindle to yieldably drive the spindle in a direction for winding said material on the reel;
   coupling means for selectively coupling and uncoupling said drive means from said spindle;
   roll drive means comprising a member movable into and out of frictional engagement with the roll on the reel, means for driving said member in a direction to drive the roll and the reel in a direction for unwinding material from the roll, said roll drive means being capable of overriding the force of the spindle drive means for driving the roll to unwind material from the roll even when said spindle drive means is coupled to the spindle;
   finger means movable into and out of engagement with the roll for deflecting the leading end of the material from the roll is being driven in a direction for unwinding material from the roll; and
   control means coupled to said coupling means for said spindle drive means and to said roll drive means for sequentially coupling the spindle drive means to the spindle to yieldably drive the spindle in a direction for winding material on the reel, thereby to tighten loose convolutions of material on the roll, then operating said roll drive means to rotate the roll in a direction for unwinding material from the roll while continuing operation of the spindle drive means, and then uncoupling the spindle drive means from the spindle.

6. The method of stripping and feeding thin, flexible strip material from a roll of such material having a leading end that tends to separate from the roll during rotation of the roll in an unwinding direction, the method comprising the steps of:
   a. initially yieldably driving the roll in a direction for winding said material on the roll for a predetermined time interval, thereby to tighten loose convolutions of material on the roll;
   b. subsequently frictionally engaging the roll and driving the roll in a direction for unwinding material from the roll by overriding the force of the yieldable drive;
   c. then terminating operation of the yieldable drive; and
   d. deflecting the leading end of the material from the roll while continuing to drive the roll in a direction for unwinding material from the roll.

PO-1050
(5/69)

UNITED STATES PATENT OFFICE
CERTIFICATE OF CORRECTION

Patent No. 3,550,879      Dated February 24, 1971

Inventor(s) John J. Bundschuh, Robert J. Roman and Kenneth W. Th

It is certified that error appears in the above-identified patent and that said Letters Patent are hereby corrected as shown below:

Column 16, line 12, before "initiating" insert --(2)--.
Column 16, line 41, after "roll" insert --when the roll--.

Signed and sealed this 11th day of May 1971.

(SEAL)
Attest:

EDWARD M. FLETCHER, JR.      WILLIAM E. SCHUYLER, JR.
Attesting Officer      Commissioner of Patents

UNITED STATES PATENT OFFICE
CERTIFICATE OF CORRECTION

Patent No. 3,550,879      Dated December 29, 1970

Inventor(s) JOHN J. BUNDSCHUH ET AL

It is certified that error appears in the above-identified patent and that said Letters Patent are hereby corrected as shown below:

On the title page, under "Assignee", -- Continuation of Application Ser. No. 470,499, July 8, 1965, now abandoned.-- should be deleted.

Signed and sealed this 7th day of November 1972.

(SEAL)
Attest:

EDWARD M. FLETCHER, JR.
Attesting Officer

ROBERT GOTTSCHALK
Commissioner of Patents